United States Patent [19]

Oddenino

[11] Patent Number: 4,930,540
[45] Date of Patent: Jun. 5, 1990

[54] FLOW DIVERTER FOR A VEHICLE HEATING SYSTEM

[75] Inventor: Manrico Oddenino, Buttigliera, Italy

[73] Assignee: ITW-Fastex Italia, S.p.A., Turin, Italy

[21] Appl. No.: 360,685

[22] Filed: Jun. 2, 1989

[30] Foreign Application Priority Data

Jun. 7, 1988 [IT] Italy ............................. 53206/88[U]

[51] Int. Cl.$^5$ .......................... B60H 1/02; F17D 3/00
[52] U.S. Cl. ............................ 137/599.1; 237/12.3 B
[58] Field of Search ...................... 137/599.1, 625, 46; 237/2 A, 12.3 A, 12.3 B, 8 C, 8 R

[56] References Cited

U.S. PATENT DOCUMENTS 1,765,984  6/1930  Kocourek et al. ............... 137/599.1
4,195,777  4/1980  Ikebukuro et al. ............ 237/12.3 B Primary Examiner—Henry A. Bennet
Attorney, Agent, or Firm—Schwartz & Weinrieb

[57] ABSTRACT

The invention relates to a flow diverter adapted to convey engine cooling water toward an air heating system for the passenger compartment of the vehicle. The diverter is installed along the circuit conveying the cooling water and, more precisely, within a chamber defined between two flanges, the first accommodating the outlets of two first pipes connected to the engine and the second accommodating the outlets of two second pipes connected to the heating system. The diverter comprises two structures rotatably fixed with respect to each other and which rotate between a first position, in which each of the first pipes has a hydraulic connection with a respective second pipe, and a second position, in which the second pipes are blocked and the first pipes, through means of the chamber, are directly fluidically connected to each other.

12 Claims, 3 Drawing Sheets 4,930,540

FLOW DIVERTER FOR A VEHICLE HEATING SYSTEM

FIELD OF THE INVENTION

The present invention relates to a flow diverter for a vehicle heating system.

BACKGROUND OF THE INVENTION

A vehicle heating system is known to comprise a radiator in which there occurs an exchange of heat between the engine cooling water and the air which is conducted into the passenger compartment of the vehicle. Along the circuit that supplies the aforenoted radiator with engine cooling water there is a tap which enables the hydraulic connection with the radiator to be opened or closed.

OBJECT OF THE INVENTION

It is the object of the present invention to provide a flow diverter for a vehicle heating system that is functional, simple in design and inexpensive to produce.

SUMMARY OF THE INVENTION

According to the present invention there is provided a flow diverter for a vehicle heating system which is installed along a circuit conveying the engine cooling water, characterized in that it comprises two structures angularly fixed with respect to each other and installed within a chamber defined between two flanges the first of which accommodates the outlet of a first pipe or conduit from which the cooling water coming from the engine flows and the outlet of a second pipe which conveys this water towards the engine preferably by means of a first radiator, and the second of which accommodates the outlet of a third pipe which conveys the cooling water for a second radiator of the heating system and the outlet of a fourth pipe which receives this water from the second radiator; the two structures rotating between a first position at which there is a hydraulic connection between the first pipe and the third pipe, and a hydraulic connection between the fourth pipe and the second pipe, and a second position at which, inside the chamber, and upon one side thereof, the outlets of the third and fourth pipes are blocked and, upon the other side thereof, there is a connection between the outlet of the first pipe and said chamber and between said chamber and the outlet of the second pipe.

BRIEF DESCRIPTION OF THE DRAWINGS

The invention will be described by way of example with reference to the accompanying drawings, in which like reference characters designate like or corresponding parts throughout the several views, and wherein.

DETAILED DESCRIPTION OF THE INVENTION

Figure 1:
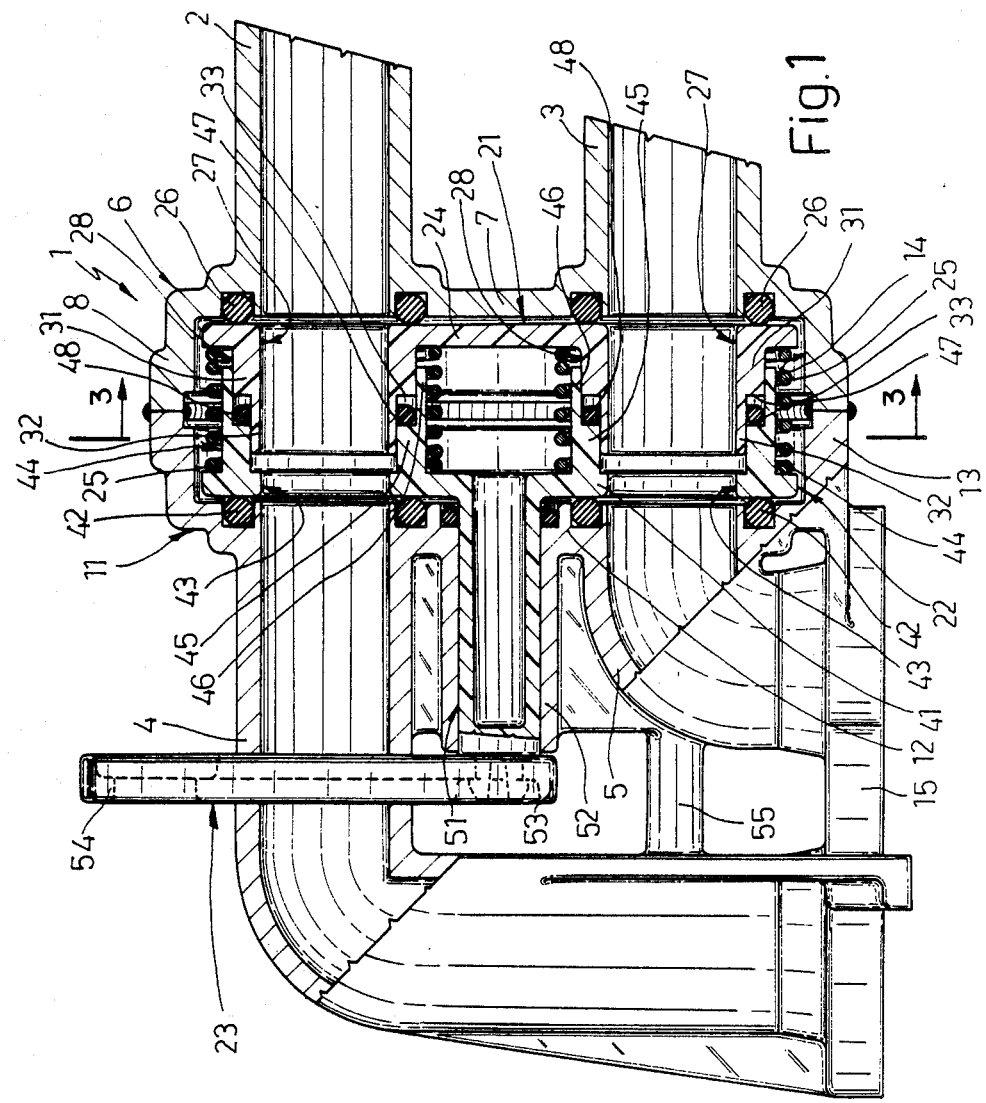
FIGS. 1 and 2 are sectional views of a flow diverter in two different phases of operation.

In the accompanying drawings, the numeral 1 indicates a flow diverter for a vehicle heating system. Diverter 1 is installed in series along the circuit that conveys the engine cooling water and, in one position (FIGS. 1 and 3), lets the cooling water flow toward a radiator (not illustrated) and return therefrom and, in a second position (FIGS. 2 and 4), obstructs the flow set forth above. Inside the radiator, the heat is exchanged between the engine cooling water and the air which is then conveyed inside the passenger compartment of the vehicle. The circuit is represented here by means of two pipes 2 and 3 which at one of their longitudinal ends are disposed parallel to each other. There are respective short L-shaped pipes or elbows 4 and 5 coaxially disposed upon the opposite ends of the pipes 2 and 3, respectively. A single flange 6 connects the ends of pipes 2 and 3. This flange 6 has the form of a substantially cylindrical cup as it has a circular base 7 accommodating the outlets of pipes 2 and 3 and a cylindrical side wall 8 that extends toward pipes 4 and 5. An additional flange 11 connects the ends of pipes 4 and 5 to the opposite ends of pipes 2 and 3. Flange 11 is substantially similar to flange 6 and, in fact, comprises a base 12 accommodating the outlets of pipes 4 and 5 and a cylindrical side wall 13 that extends toward pipes 2 and 3. Side walls 8 and 13 are coaxial with respect to each other and mechanically fixed to each other by means of welding.

In this way, a chamber 14 is defined between flanges 6 and 11 as well as between pipes 2 and 3 and pipes 4 and 5. A third flange 15 connects the other ends of pipes 4 and 5. This flange 15 is equipped with means of attachment to a support structure not illustrated. In reference to FIGS. 1 and 2, diverter 1 is installed inside chamber 14 and, in one operating position (FIG. 1), lets the cooling water flow between pipe 2 and pipe 4 and between pipe 5 and pipe 3. In a second operating position (FIG. 2), diverter 1 blocks the ports within chamber 14 of pipes 4 and 5 and lets the engine cooling water flow through chamber 14 directly from pipe 2 to pipe 3. Diverter 1 comprises two structures 21 and 22 which are rotatably fixed with respect to each other and adapted to be made to rotate by means of the activation of an external lever 23. Structure 21 has a circular base 24 biased by means of two pretensioned springs 25 toward base 7 of flange 6. Upon base 7, around the outlets of pipes 2 and 3, there are formed annular slots for a respective annular fluid-tight gasket 26. Upon base 24, in diametrically opposed positions there are formed two passing holes 37 upon the edge of which there is a respective tubular sleeve 28 extending toward structure 22. The sleeve has two portions 31 and 32 with the same internal diameter and different external diameters. In particular, portion 32 is the end piece and has a smaller external diameter than portion 31 so that this portion defines an external annular shoulder 33. Along another diameter orthogonal to the one connecting the longitudinal axes of holes 27, upon base 24 there are formed two diametrically opposed passing holes 34. Holes 34 define a diameter substantially equal to the internal diameter of pipes 2 and 3 and, upon a side disposed nearer to a sleeve 28, as one would move, with respect to hole 34, 90° in a clockwise direction, in reference to FIGS. 3 and 4, there is also defined a respective lobe 35.

Structure 22 has a circular base 41 biased by means of said springs 25 toward base 12 of flange 11. In this case also, upon base 12, around the outlets of pipes 4 and 5, there are formed annular slots for a respective annular fluid-tight gasket 42. Upon base 41, in diametrically opposed positions, there are formed two passing holes 43 upon the edge of which a respective tubular sleeve 44 extends toward structure 21. The sleeve defines two portions 45 and 46 which have the same external diameter and different internal diameters. In particular, portion 46 is the end piece and has a greater internal diameter than portion 45 where an internal annular shoulder 47 is thus defined therebetween.

Figure 3:
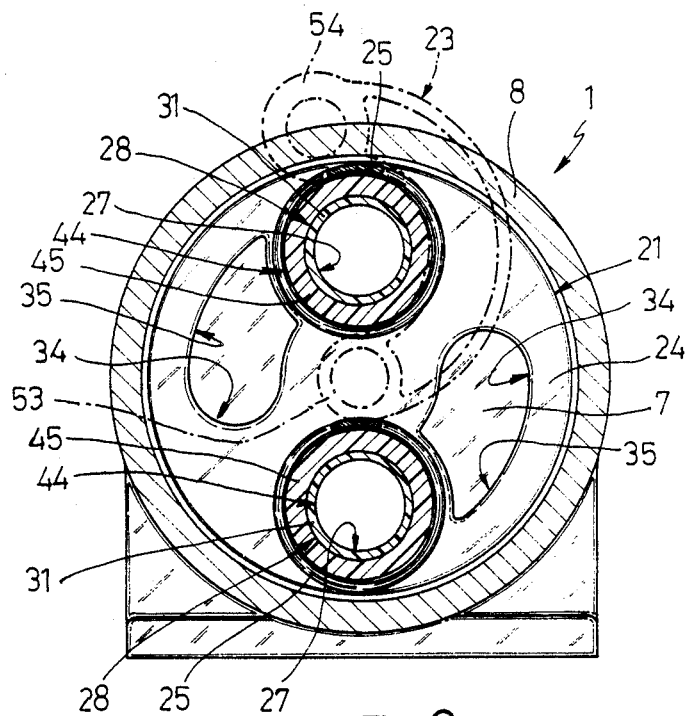
FIG. 3 is a sectional view taken along line III—III shown in FIG. 1.
Figure 4:
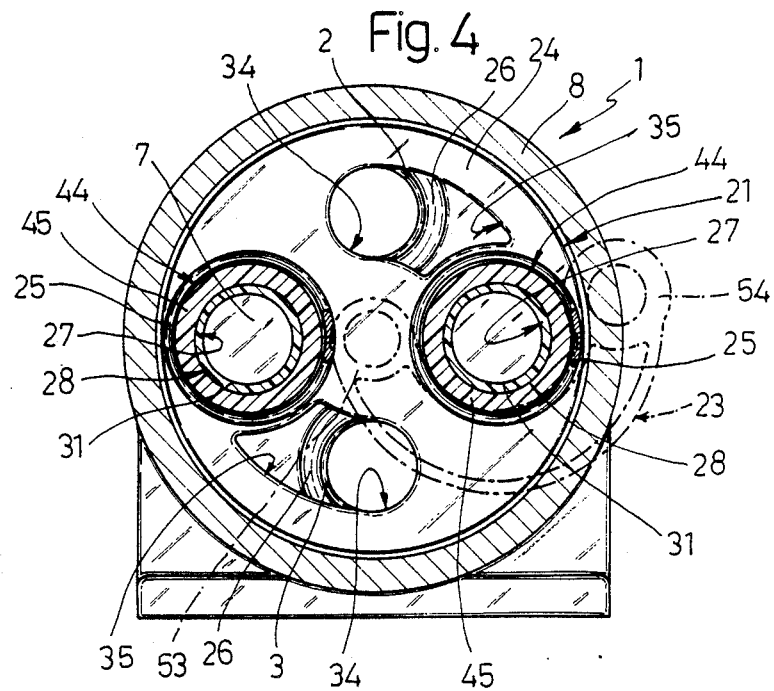
FIG. 4 is a sectional view taken along line IV—IV shown in FIG. 2.

In reference to FIG. 1, sleeves 28 and 44 are coupled together so as to rotatably mount structures 21 and 22 with respect to each other. Sleeves 28 are internally disposed within sleeves 44 and in, particular, portion 31 has an external diameter substantially equal to the internal diameter of portion 46 and coaxially overlaps a part of portion 46, and portion 32 has an external diameter substantially equal to the internal diameter of portion 45 and coaxially overlaps a part of portion 45. Between shoulders 33 and 47 there is an annular slot occupied by means of an annular fluid-tight gasket 48. Around sleeves 44 and between bases 24 and 41, springs 25 are installed. Upon the central part of base 41, there is mounted, extending coaxially and toward the outside of chamber 14, a cylindrical pin 51 one end of which, extending beyond a coaxial sleeve 52 integrally formed with base 12 of flange 11, is fixed to a first end 53 of lever 23. This lever has a second end 54 connected in a known manner, for example, as a tie rod to a rotation control element of lever 23 about the longitudinal axis of pin 51. Lever 23, as illustrated in FIGS. 3 and 4, is in the form of a circular arc. Lever 23 is able to rotate substantially 90° between a first position (FIGS. 1 and 3), at which its travel is blocked by means of pipe 4, and a second position (FIGS. 2 and 4) at which its travel is blocked by means of a fixed rod 55 incorporated between pipes 4 and 5 and within the vicinity of flange 15. It should also be noted that pipes 4 and 5 are incorporated with flanges 11 and 15, sleeve 52 and rod 55 as a single piece.

Figure 2:
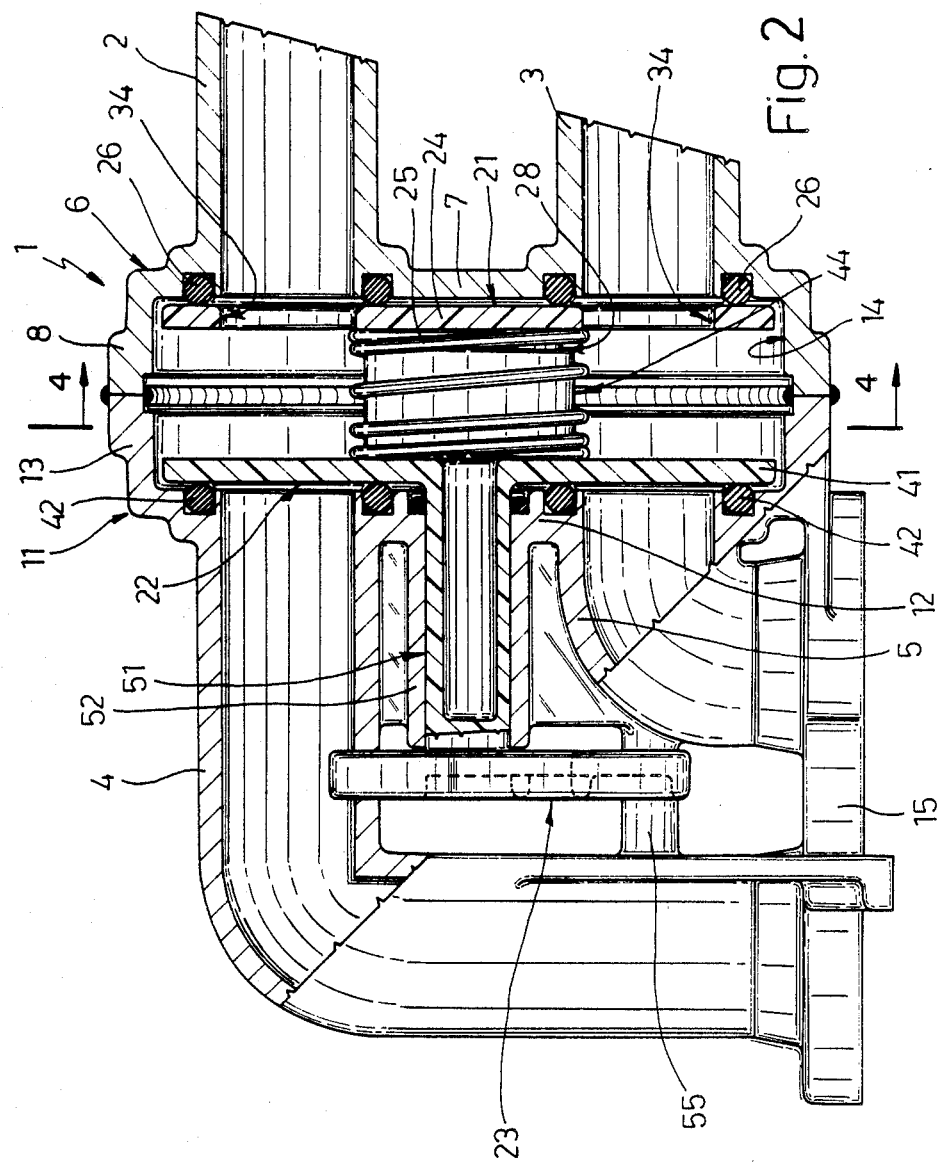

In the position illustrated in FIGS. 1 and 2, the two pairs of sleeves 28 and 44 are disposed upon the same axis, respectively, as the outlets of pipes 2 and 4 and pipes 3 and 5, and gaskets 26, 42 and 48 maintain the passages through chamber 14 fluid-tight. The engine cooling water thus flows, in the following order, through pipe 2, corresponding sleeves 28 and 44, and pipe 4 into the radiator and from which it returns. More particularly, the water flows back, in the following order, through pipe 5, corresponding sleeves 44 and 28, and pipe 3 from which it moves toward a second radiator that cools the water before it enters the engine. By rotating lever 23 in a clockwise direction (in reference to FIGS. 3 and 4) the diverter, comprising structures 21 and 22, is rotated to the same degree. In this second position (FIGS. 2 and 4) the ports of pipes 4 and 5 are closed in a fluid-tight manner by means of the solid parts of base 41 of structure 22, while holes 34 are now disposed upon the same axes as the outlets of pipes 2 and 3. The engine cooling water from pipe 2 therefore flows into chamber 14 through means of a lobed hole 34, and from the lobed hole through means of the other lobed hole 34 into pipe 3.

From the description set forth above, the advantages of an embodiment of the present invention are evident.

In particular, it relates to a diverting element that has a simple design, can be remotely controlled, and is installed in series within the engine cooling circuit. Unlike the circuits currently installed upon vehicles in which the tap is installed in parallel, installation in series prevents the stagnation of the water between the cooling circuit and the tap.

Finally, it is clear that modifications may be made and variants produced of diverter 1 set forth and illustrated above, without exceeding the scope of the present invention as defined in the appended claims.

I claim:

1. A flow diverter for a vehicle heating system installed along a circuit conveying motor cooling water, characterized in that it comprises:

two structures (21 and 22) angularly fixed to each other and installed within a chamber (14) defined between two flanges (6 and 11), the first flange (6) of which accommodates an outlet of a first pipe (2) from which cooling water coming from said motor flows, and an outlet of a second pipe (3) which conveys said water back towards said motor preferably by means of a first radiator; and the second flange (11) of which accommodates an outlet of a third pipe (4) which conveys said cooling water toward a second radiator of said heating system, and an outlet of a fourth pipe (5) which receives said water back from said second radiator;

said structures (21 and 22) being rotatable between a first position in which there is a hydraulic connection between said first pipe (2) and said third pipe (4), and a hydraulic connection between said fourth pipe (5) and said second pipe (3), and a second position in which, inside said chamber (14), on one side thereof, said outlets of said third pipe (4) and said fourth pipe (5) are blocked, and on the other side thereof, there is a fluidic connection between said outlet of said first pipe (2) and said chamber (14), and between said chamber (14) and said outlet of said second pipe (3).

2. A flow diverter as claimed in claim 1, characterized in that:

said first flange (6) presents a first board (7) accommodating said outlets of said first pipe (2) and said second pipe (3), and a substantially cylindrical side wall (8) that extends toward said second flange (11) which also presents a second board (12) accommodating said outlets of said third pipe (4) and said fourth pipe (5), and a substantially cylindrical side wall (13) fixed to the corresponding side wall (8) of said first flange (6);

said outlets of said first pipe (2) and said second pipe (3) being coaxial with respect to said outlets of said third pipe (4) and said fourth pipe (5), respectively.

3. A flow diverter as claimed in claim 2, characterized in that:

said structures (21 and 22) present a respective third board (24) and a fourth board (41), which by means of spring means (25) are pressed, respectively, toward said first board (7) and said second board (12); and within said first and second boards (7 and 12), there are defined annular slots around said outlets of said pipes for respective annular fluid-tight gaskets (26 and 42).

4. A flow diverter as claimed in claim 3, characterized in that:

upon said third board (24), in diametrically opposite positions, there are two first fluid passing holes (27) on the edge of which there is mounted a respective first sleeve (28), and upon said fourth board (41) in diametrically opposite positions, there are two second fluid passing holes (43) on the edge of which there is mounted a respective second sleeve (44), coupled coaxially and in a fluid-tight manner about the outside of a respective one of said first sleeves (28); and when said structures (21 and 22) are disposed in said first position, a first pair of said first and second sleeves (28 and 44) are disposed upon the same axis and linked with said first and third pipes (2 and 4), while the other pair of said first and second sleeves (28 and 44) are disposed upon the same axis and linked with said second and fourth pipes (3 and 5).

5. A flow diverter as claimed in claim 4, characterized in that said first sleeve (28) internally occupies the corresponding second sleeve (44); there being installed an annular fluid-tight gasket (48) between said first and second sleeves.

6. A flow diverter as claimed in claim 4, characterized in that said spring means comprise two springs (25) installed between said third (24) and fourth (41) boards around a respective pair of said first (28) and second (44) sleeves.

7. A flow diverter as claimed in claim 4, characterized in that on the third board (24), in diametrically opposite positions, there are two third fluid passing holes (34) which, when said structures (21 and 22) are disposed in said second position, are coaxial and linked, at one end, with the outlets of said first (2) and second (2) pipes, respectively, and at the other end, linked with the internal area of said chamber (14) defined around the pairs of said sleeves (28 and 44).

8. A flow diverter as claimed in claim 7, characterized in that said third holes (34) are disposed upon an orthogonal diameter with respect to the one along which said first holes (27) are located; said two positions of said structures (21 and 22) being disposed at 90° with respect to each other.

9. A flow diverter as claimed in claim 7, characterized in that along an edge of each one of said third holes (34) there is a respective passing lobe (35).

10. A flow diverter as claimed in claim 3, characterized in that, from the central part of said fourth board (41) there extends coaxially towards the outside of said chamber (14) a pin (51) fixed to a lever (23) which imparts rotation to said structures (21 and 22) in one direction or the other.

11. A flow diverter as claimed in claim 10, characterized in that it further comprises means for halting the rotation of said lever (23) after a 90° travel movement.

12. A flow diverter as claimed in claim 11, characterized in that said lever (23) presents longitudinally a substantially circular arc form.

* * * * *